United States Patent
Jin et al.

(10) Patent No.: US 9,430,424 B2
(45) Date of Patent: Aug. 30, 2016

(54) UNIVERSAL SERIAL BUS (USB) DEVICE ACCESS FROM ONE OR MORE VIRTUAL MACHINES

(71) Applicant: HUA ZHONG UNIVERSITY OF SCIENCE TECHNOLOGY, Wuhan Hubei (CN)

(72) Inventors: Hai Jin, Hubei (CN); Pei Duan, Hubei (CN); Deqing Zou, Hubei (CN)

(73) Assignee: HUA ZHONG UNIVERSITY OF SCIENCE TECHNOLOGY, Wuhan, Hubei (CN)

( * ) Notice: Subject to any disclaimer, the term of this patent is extended or adjusted under 35 U.S.C. 154(b) by 0 days.

(21) Appl. No.: 14/422,558

(22) PCT Filed: Jul. 9, 2013

(86) PCT No.: PCT/CN2013/079042
§ 371 (c)(1),
(2) Date: Feb. 19, 2015

(87) PCT Pub. No.: WO2015/003313
PCT Pub. Date: Jan. 15, 2015

(65) Prior Publication Data
US 2015/0220467 A1 Aug. 6, 2015

(51) Int. Cl.
*G06F 13/00* (2006.01)
*G06F 13/32* (2006.01)
*G06F 9/455* (2006.01)
*G06F 11/30* (2006.01)
(Continued)

(52) U.S. Cl.
CPC ........... *G06F 13/32* (2013.01); *G06F 9/45533* (2013.01); *G06F 11/3048* (2013.01); *G06F 11/3068* (2013.01); *G06F 13/14* (2013.01); *H04L 69/08* (2013.01); *H04L 69/16* (2013.01); *G06F 2009/4557* (2013.01); *H04L 63/08* (2013.01)

(58) Field of Classification Search
CPC .............................. G06F 13/32; G06F 13/14
USPC ..................................... 710/18, 107
See application file for complete search history.

(56) References Cited

U.S. PATENT DOCUMENTS

| | | | |
|---|---|---|---|
| 7,870,153 B2 | 1/2011 | Croft et al. | |
| 9,311,471 B2 * | 4/2016 | Wei | ...... G06F 9/45558 |
| 2008/0209016 A1 | 8/2008 | Karve et al. | |

(Continued)

FOREIGN PATENT DOCUMENTS

WO    2010148294 A1    12/2010

OTHER PUBLICATIONS

"Citrix Product Support for USB Devices," accessed at http://www.dabcc.com/print.aspx?id=4451, accessed on Jun. 13, 2014, pp. 1-2.

(Continued)

*Primary Examiner* — Tammara Peyton
(74) *Attorney, Agent, or Firm* — Brundidge & Stanger, P.C.

(57) ABSTRACT

To provide access to USB devices coupled to a client computing device for a user of virtual machine executing on a server, the server, in some examples, may be configured to pack USB request blocks into IP data packets and transmit the IP data packets over a network. Responsive to receiving the IP data packets, the client computing device may extract the USB request blocks from the IP data packets and provide the access to the USB devices for the virtual machine user.

21 Claims, 5 Drawing Sheets

(51) Int. Cl.
G06F 13/14 (2006.01)
H04L 29/06 (2006.01)

(56) References Cited

U.S. PATENT DOCUMENTS

2010/0153924 A1* 6/2010 Andrews ............. G06F 11/3688
717/126
2011/0296408 A1 12/2011 Lo et al.
2011/0296488 A1 12/2011 Dandekar et al.

OTHER PUBLICATIONS

"Supercharge Desktop Virtualization with RemoteFX," Biztech, accessed at http://web.archive.org/ web/20120924075511/http://www.biztechmagazine.com/article/2011/04/supercharge-desktop-virtualization-remotefx, Apr. 13, 2011, pp. 1-6.
Catuogno, L., "Transparent Mobile Storage Protection in Trusted Virtual Domains," In 23rd Large Installation System Administration Conference, pp. 14 (Nov. 2009).
Chen, X., et al., "Overshadow: A Virtualization-Based Approach to Retrofitting Protection in Com-modity Operating Systems," In Proceedings of the 13th Conference on Architectural Support for Programming Languages and Operating Systems, pp. 2-13, ACM, (Oct. 2008).
Dinaburg, A., et al., "Ether: Malware Analysis via Hardware Virtualization Extensions," In Proceedings of the 15th ACM Conference on Computer and Communications Security, pp. 51-62, ACM, (Oct. 2008).
Jiang, X., et al., "Stealthy. Malware Detection Through VMM-Based" Out-of-the-Box" Semantic View Reconstruction," ACM Conference on Computer and Communications Security, pp. 128-138 (Oct. 2007).
Jiao, Y., et al., "A Remote USB architecture for virtual machine oriented device sharing and transparent migration," 2012 IEEE 18th International Conference on Parallel and Distributed system, pp. 744-749 (Dec. 2012).
Nance, K., et al., et al., "Virtual Machine Introspection Observation or Interference," IEEE Security & Privacy, vol. 6, Issue 5, pp. 32-37 (Sep./Oct. 2008).
Payne, B.D., et al., "Laves: An Architecture for Secure Active Monitoring Using Virtualization," IEEE Symposium on Security and Privacy, pp. 233-247 (Sep. 2008).
Payne, B.D., et al., "Secure and Flexible Monitoring of Virtual Machines," In Proceedings of the 23rd Annual Computer Security Applications Conference, pp. 385-397, IEEE (Dec. 2007).
Perez, R., et al., "Virtualization and Hardware-based Security," IEEE Security & Pri-vacy, vol. 6, Issue 5, pp. 24-31 (Sep./Oct. 2008).
Petroni, N.L., and Hicks, M., "Automated Detection of Persistent Kernel Control-Flow Attacks," In Proceedings of the 14th ACM conference on Computer and communications security, pp. 103-115, ACM (Sep. 2007).
Rhee, J., et al., "Defeating Dynamic Data Kernel Rootkit Attacks via VMM-based Guest-Transparent Monitoring," In Proceeding of International Conference on Availability, Reliability and Security, pp. 74-81, IEEE (Sep. 2009).
Riley, R., et al., "Guest-Transparent Prevention of Kernel Rootkits with VMM-based Memory Shadowing," In Proceedings of 11th International Symposium on Recent Advances in Intrusion Detection, pp. 1-20 (Oct. 2008).
Seshadri, A., "SecVisor: A tiny hypervisor to provide lifetime kernel code integrity for commodity OSes," In Proceedings of the ACM Symposium on Operating System Principles, pp. 335-350, ACM (Oct. 2007).
Shanbhogue, V., et al., "Virtualization Enabled Integrity Services(VIS) Archi-tecture Overview," Intel Corporation, pp. 10 (Aug. 2008).
Singaraju, G., and Kang, B.H., "Concord: A secure mobile data authorization framework for regulatory compliance," In Proceedings of the 22nd Large Installation System Administration Conference (LISA '08), pp. 91-102 (Nov. 2008).
Weinhold, C., and Hartig, H., "VPFS: Building a virtual private file system with a small trusted computing base," In Proceedings of the 2008 EuroSys Conference, ACM, pp. 81-93 (Nov. 2008).
Williams, D., et al., "Device Driver Safety Through a Reference Validation Mechanism," 8th USENIX Symposium on Operating Systems Design and Implementation, pp. 241-254 (Nov. 2008).
Xu, M., et al., "Towards a VMM-based Usage Control Framework for OS Kernel Integrity Protection," In Proceeding of the 12th ACM Symposium on Access Control Models and Technologies, pp. 71-80, ACM (Oct. 2007).
Yang, J., and Shin, K.G., "Using Hypervisor to Provide Data Secrecy for User Applications on a Per-Page Basis," In Proceedings of the fourth ACM SIGPLAN/SIGOPS international conference on Virtual execution environments, pp. 71-80. ACM, (Mar. 2008).
International Search Report and Written Opinion for International Application No. PCT/CN2013/079042 issued on Apr. 3, 2014.

* cited by examiner

UNIVERSAL SERIAL BUS (USB) DEVICE ACCESS FROM ONE OR MORE VIRTUAL MACHINES

CROSS-REFERENCE TO RELATED APPLICATION

This Application is the National Stage filing under 35 US.C. §371 of PCT Application Ser. No. PCT/CN13/79042 filed on Jul. 9, 2013. The disclosure of the PCT Application is hereby incorporated herein by reference in its entirety.

TECHNICAL FIELD

The technologies described herein pertain generally to access to a Universal Serial Bus (USB) devices, which are physically coupled to a client computing device, from a virtual machine executing on a sever.

BACKGROUND

Unless otherwise indicated herein, the approaches described in this section are not prior art to the claims in this application and are not admitted to be prior art by inclusion in this section.

While utilizing a virtual machine that is executing on a server, a user may have reason to access one or more USB devices that are physically coupled to a client computing device, e.g., the user may have reason to access documents stored on a USB storage device coupled to the client computing device.

SUMMARY

Technologies are generally described for accessing USB devices. The various techniques may be implemented in various systems, methods, and/or computer-readable mediums.

In some examples, various techniques may be implemented as systems. Some systems may include a server that includes one or more virtual machines configured to execute on the server, and a service console configured to receive one or more USB request blocks from one or more of the virtual machines. The system may further include a client computing device, communicatively coupled to the server, and a stub driver that is configured to receive one or more data packets from the service console and to extract the one or more USB request blocks from the one or more data packets. The server may further include a physical USB interface.

In some examples, various techniques may be implemented as methods. Some methods may include generating one or more USB request blocks that include one or more instructions to perform at least one of a read operation or a write operation with regard to one or more physical USB devices; packaging the one or more USB request blocks into one or more data packets; transmitting the one or more data packets over a network; and extracting the one or more USB request blocks from the one or more data packets.

In some other examples, various techniques may be implemented as executable instructions stored on one or more computer-readable mediums. Some computer-readable mediums may store executable instructions that include decoding one or more data packets, and extracting one or more USB request blocks from the one or more data packets, carrying instructions for at least one of a read operation or a write operation relative to one or more physical USB devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
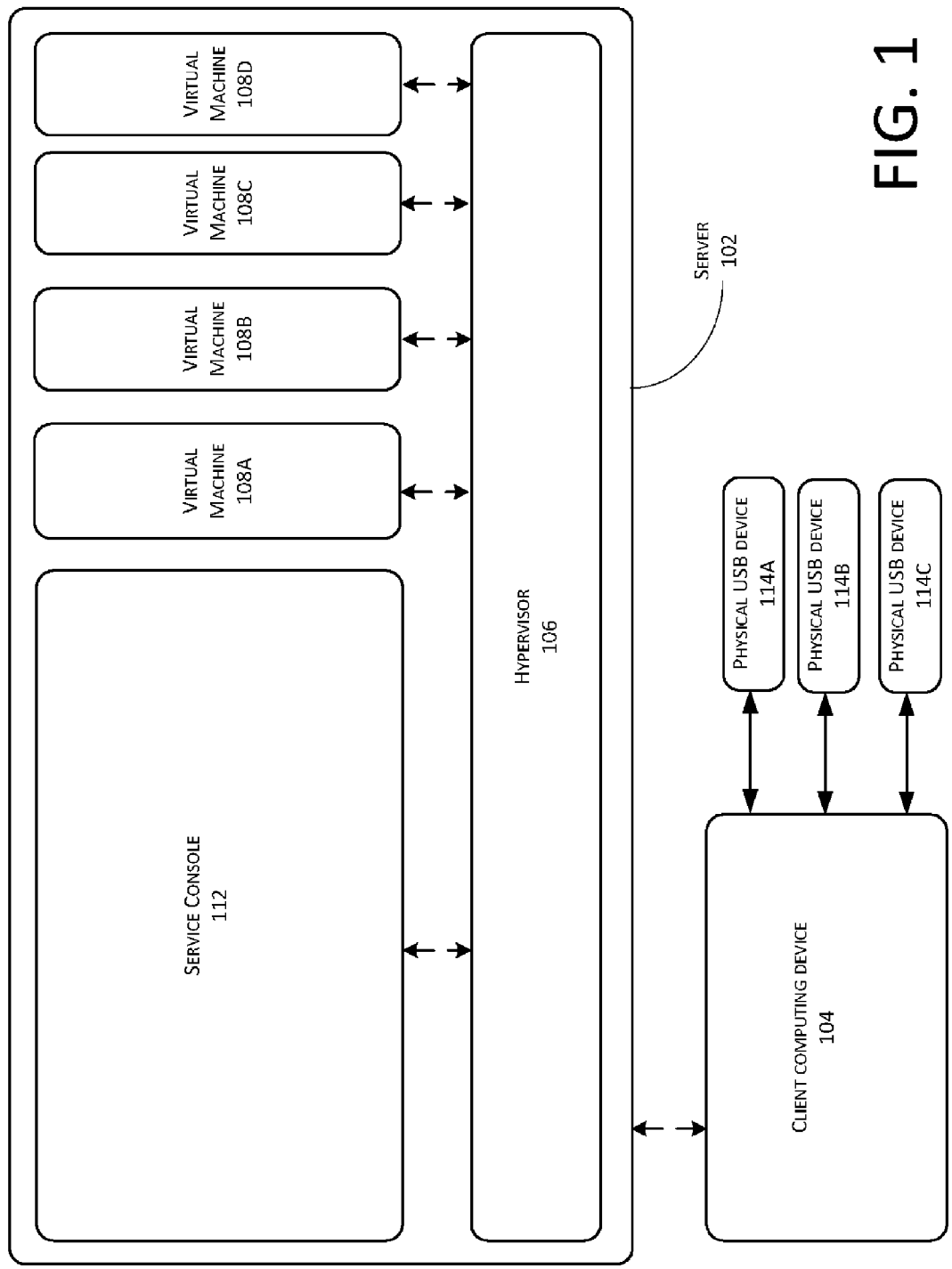
FIG. 1 shows an example system in which USB device access may be implemented, arranged in accordance with at least some embodiments described herein.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 100 in which USB device access may be implemented, arranged in accordance with at least some embodiments described herein. As depicted, example system 100 may include, at least, a server 102 communicatively connected to a client computing device 104. Server 102 may include a service console 112, a hypervisor 106, and one or more virtual machines 108A, 108B, 108C, . . . , 108N, etc. Physical USB devices 114A, 114B, . . . , 114N, etc. may be coupled, or physically plugged in, to client computing device 104. Unless context requires specific reference to one or more of virtual machines 108A, 108B, 108C, ..., 108N, reference may be made to "virtual machines 108," below; similarly, reference may be made to "physical USB devices 114, below.

Server 102 may refer to a physical computer, or a computer hardware system, that is dedicated to execute one or more computing services as a host to serve the needs of one or more other computers on a network. Operating systems, such as Microsoft Windows®, Linux, OS X, etc., may be executed on server 102 to allow a variety of software programs to be executed on or by one or more of the hardware components of server 102. Server 102, in some examples, may include one or more hardware components (not shown) including Central Processing Units (CPU), physical storage space, memories, network ports, etc.

Virtual machines 108 may refer to one or more software emulations of one or more physical machines, e.g., computer, executing on server 102. Virtual machines 108 may have appropriate operational access to work with the hardware components of server 102 to execute software programs in the same manner as on physical machines. Notably, "virtual machine," as referenced herein, may or may not have direct correspondence to any physical, or real, machines. In accordance with some examples, virtual machines 108 may submit requests to access physical USB devices 114 to hypervisor 106.

Hypervisor 106 may refer to computer software, firmware, hardware, or combinations thereof that create and execute virtual machines 108 on sever 102. Hypervisor 106 may be configured to execute directly on the hardware components of server 102 and further manage the operation of virtual machines 108. That is, hypervisor 106 may be configured to have control, over one or more virtual components, to utilize, interrupt, grant, forbid, or deny the requests from one or more of virtual machines 108 to access hardware components of server 102, which may include central processing units, system memories, or network ports. In accordance with at least some examples, hypervisor 106 may transmit the requests to access physical USB devices 114 to service console 112.

Service console 112 may refer to a software component or module, configured to execute on server 102. Service console 112 may be further configured to monitor and/or manage the hardware components and/or physical interfaces of sever 102. Service console 112 may further be configured to receive one or more USB request blocks from virtual machine 108, and to communicate with virtual machines 108 in response to requests to access hardware components from virtual machines 108. In accordance with some examples, USB request blocks may include requests to access one or more physical USB devices 114. Service console 112 may be configured to pack appropriate ones of the USB request blocks into one or more data packets in accordance with Internet Protocol (IP) as referenced by the Institute of Electrical and Electronic Engineers (IEEE) ("IP data packets" hereafter). The one or more IP data packets may be further transmitted, via one or more of the aforementioned networks, to client computing device 104. In some examples, service console 112 may be communicatively coupled to a network including an intranet, extranet, or the internet.

Client computing device 104 may refer to a physical computer, or a computer hardware system including, but not limited to, tablets, laptop computers, or non-laptop computers configuration. Further, client computing device 104 may also be implemented as a portion of a small-form factor portable (or mobile) electronic device such as a cell phone, a person data assistant (PDA), a personal media player device, a wireless web-watch device, a personal headset device, an application specific device, or a hybrid device that include any of the above function. Client computing device 104 may be configured to provide one or more physical USB interfaces. In accordance with some examples, client computing device 104 may be configured to connect to server 102 over one or more of the aforementioned networks to submit information to and retrieve information from one of virtual machines 108 on server 102. The retrieved information may be displayed on, e.g., a graphical user interface of client computing device 104. In accordance with some examples, client computing device 104 may be configured to decode IP data packets transmitted by service console 112 to thereby extract the one or more USB request blocks that include requests to access one or more of physical USB devices 114. With the requests to access one or more of physical USB devices 114, client computing device 104 may be configured to access one or more of physical USB devices 114, retrieve corresponding information from the appropriate ones of physical USB devices 114, and transmit the information to server 102 via the network.

Physical USB devices 114 may refer to one or more physical devices that are removably coupled to client computing device 104 with cables, connectors, and communication protocols defined by USB standard. Physical USB devices 114 may refer to one or more of a variety of devices including flash drives, keyboards, pointing devices, digital cameras, printers, portable media players, disk drives, and network adapters to client computing device 104.

In accordance with at least some examples, a user utilizing client computing device 104 may request one of virtual machines 108 to execute multiple operations, which may include, e.g., accessing one or more of physical USB devices 114. For example, the user may request one of virtual machines 108 (e.g., virtual machine 108A) to print a specified document on a USB printer that is communicatively connected to client computing device 104. In accordance with the example, virtual machine 108A may submit, to service console 112 via hypervisor 106, one or more USB request blocks that include requests to access one or more of physical USB devices 114. Service console 112 may be configured to pack the appropriate USB request blocks into one or more data packets following internet protocol ("IP data packets" hereafter). The one or more IP data packets may be further transmitted, via one or more of the aforementioned networks, to client computing device 104, which may be configured to decode the IP data packets to thereby extract the one or more USB request blocks. With the requests to access one or more of physical USB devices 114 included in the IP data packets, client computing device 104 may be configured to access one or more physical USB devices 114, retrieve corresponding information from the appropriate ones of physical USB devices 114, and transmit the information to server 102 via the network.

Figure 2:
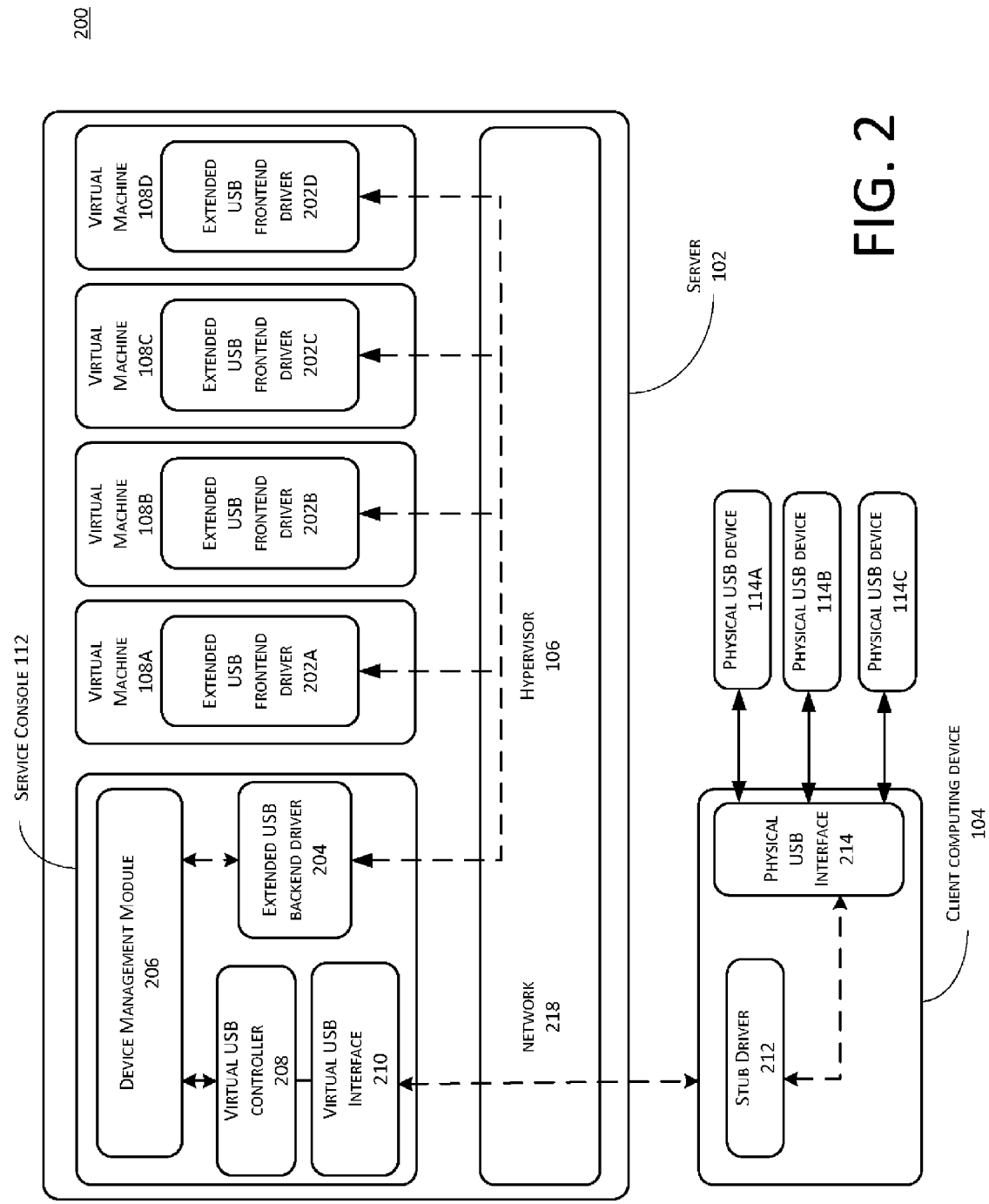
FIG. 2 shows another example system by which USB device access may be implemented, arranged in accordance with at least some embodiments described herein.

FIG. 2 shows another example system 200 by which USB device access may be implemented, arranged in accordance with at least some embodiments described herein. Features that are shown and described above with regard to FIG. 1 may be referenced by the same reference numbers, in connection with FIG. 2. Further, as depicted in FIG. 2, each of virtual machines 108 may include an extended USB frontend driver 202A, 202B, 202C, 202D, etc. Unless context renders appropriate specific reference to one or more of extended USB frontend drivers 202A, 202B, 202C, 202D, etc., general reference may be made collectively to "extended USB frontend drivers 202." Service console 112 may include, at least, a device management module 206, an extended USB backend driver 204, a virtual USB controller 208, and a virtual USB interface 210. Client computing device 104 may at least include a stub driver 212 and a physical USB interface 214.

Extended USB frontend driver 202 may refer to a software component or module, configured to execute on one of virtual machines 108 (e.g., virtual machine 108A). Extended USB frontend driver 202 may further be configured to communicate with hypervisor 106. That is, extended USB frontend driver 202 may issue operation commands (e.g., print a document on a USB printer, activate a USB web camera, etc.) in the form of one or more USB request blocks that may be transmitted to hypervisor 106. Hypervisor 106 may be configured to then transmit the USB request blocks to extended USB backend driver 204 for further communication with physical USB device 114.

Extended USB backend driver 204 may refer to a similar software component or module of service console 112 that may be configured to receive the one or more USB request blocks from hypervisor 106, and to transfer the one or more USB request blocks to device management module 206.

Device management module 206 may refer to a software component or module of service console 112 that may be configured to verify the identity of virtual machine 108A and, further, authorize the communication between virtual machine 108A and physical USB device 114. That is, in the context of the example referenced above, upon receiving the one or more USB request blocks from extended USB backend driver 204, device management module 206 may record the identity of virtual machine 108A and generate, based on the identity, verification information (e.g., a secret key) that may be forwarded to virtual machine 108A for verification of the identity of virtual machine 108A prior to authorizing communication between virtual machine 108A and physical USB device 114. The secret key may be obtained by stub driver 212 from virtual machine 108A.

Virtual USB controller 208 may refer to a software component or module of service console 112 that may be configured to emulate a physical USB controller. Virtual USB controller 208 may be configured to encapsulate, or pack, the one or more USB request blocks received from device management module 206 into IP data packets for further transmitting over a network 218. The encapsulated IP data packets may be submitted, by virtual USB controller 208, to virtual USB interface 210.

Virtual USB interface 210 may refer to a software component or module of service console 112 that may be configured to emulate a physical USB interface. Virtual USB interface 210 may be configured to communicate with client computing device 104, via network 218. That is, virtual USB interface 210 may be configured to transmit and receive the IP data packets to and from client computing device 104.

Stub driver 212 may refer to a software program configured to execute on client computing device 104 that may further be configured to decode the IP data packets received from virtual USB interface 210, to extract the one or more USB request blocks from the IP data packets, and to submit the one or more USB request blocks to physical USB interface 214 in order for retrieving information or executing operations to exert control over an intended one of physical USB devices 114.

In accordance with at least some examples, stub driver 212 and device management module 206 may be configured to verify the identity of virtual machine 108A prior to establishing communication between physical USB device 114 and virtual machine 108A. That is, stub driver 212 may assume control of an intended one or more physical USB devices 114. Subsequently stub driver 212 may sign the IP data packets with the aforementioned secret key, i.e., associate the aforementioned secret key to the IP data packets, and submit the signed IP data packets to device management module 206. Since the secret key contains the identity of virtual machine 108A, device management module 206 may then authorize the communication between virtual machine 108A and physical USB device 114.

Physical USB interface 214 may refer to a hardware component that may be configured to communicatively communicate with client computing device 104, via a USB connection. Physical USB interface 214 may be configured to receive the USB request blocks and perform the operations included in the one or more of the USB request blocks from stub driver 212, e.g., read requested information from physical USB device 114, activate physical USB device 114, etc., when physical USB device 114 is coupled to physical USB interface 214.

Figure 3:
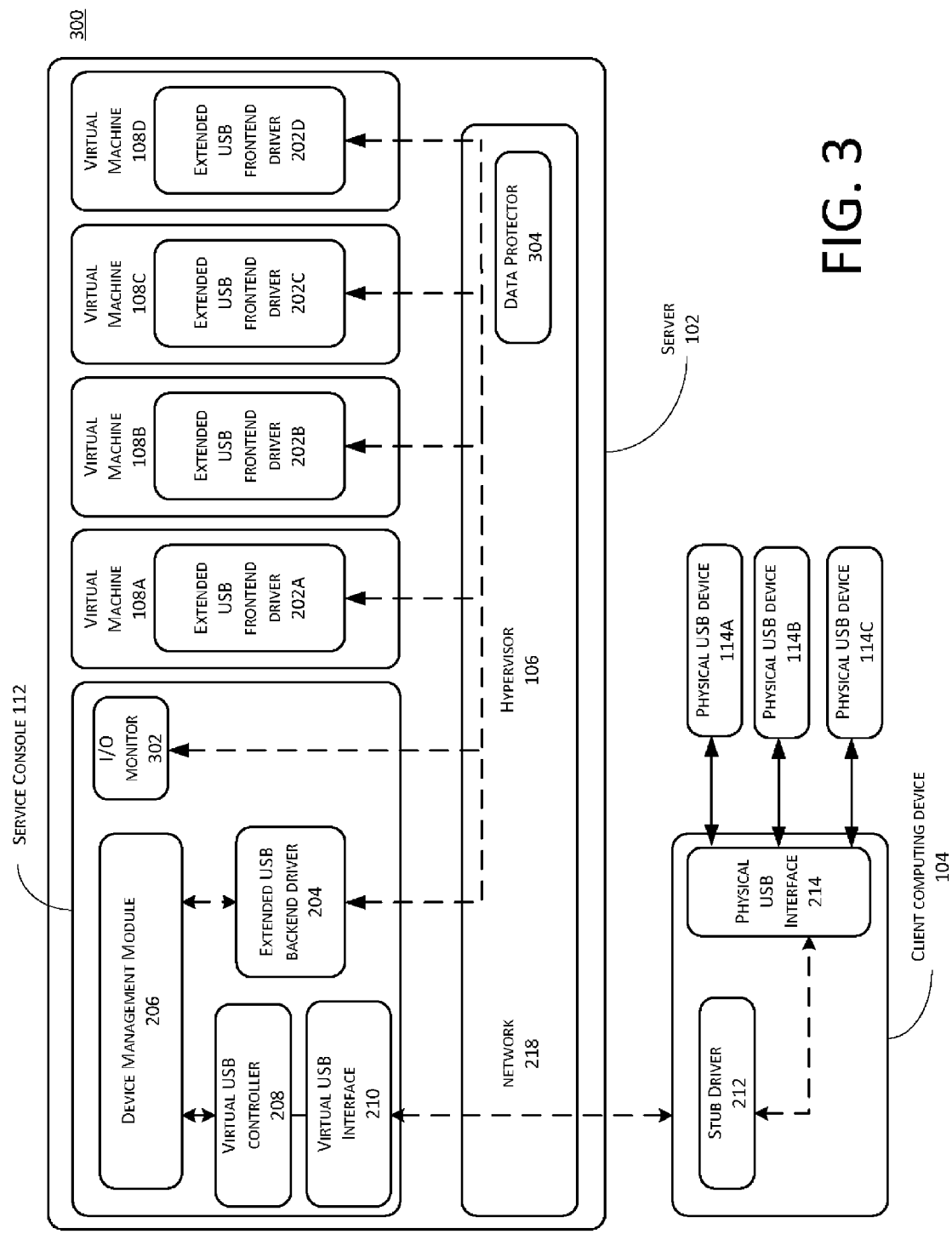
FIG. 3 shows yet another example system by which USB device access may be implemented, arranged in accordance with at least some embodiments described herein.

FIG. 3 shows yet another example system 300 by which USB device access may be implemented, arranged in accordance with at least some embodiments described herein. Features that are shown and described above with regard to FIG. 1 and/or FIG. 2 may be referenced by the same reference numbers, in connection with FIG. 3. As depicted, service console 112 may further include an input/output (I/O) monitor 302, and hypervisor 106 may further include a data protector 304.

I/O monitor 302 may refer to a software component or module of service console 112 that may be configured to monitor any suspicious I/O activities or requests of virtual machines 108. In accordance with at least some examples, I/O monitor 302 may be configured to monitor USB requests blocks sent by virtual machine 108 and to detect suspicious I/O activities when at least one of virtual machines 108 attempts to access data retrieved for others of virtual machines 108. To protect the data retrieved from physical USB device 114, hypervisor 106 may be configured to buffer the I/O flows of virtual machines 108 in memory. That is, the I/O activities conducted and requests submitted by virtual machines 108 may be recorded in memory.

Data protector 304 may refer to a software component or module of hypervisor 106 that may be configured to protect data from suspicious activities, e.g., one virtual machine requesting to access information retrieved for other virtual machines. Since hypervisor 106 may be configured to have the highest authority to grant or deny the requests from virtual machines 108 to access the hardware components of server 102, data protector 304 may be designated with the authority to deny requests to access physical memories from virtual machines 108 when I/O monitor 302 detects some suspicious activities. For example, when an unauthorized virtual machine requests access to the data retrieved for virtual machine 108A and stored in memory under the control of hypervisor 106, I/O monitor 302 may detect the suspicious activity and further notify data protector 304. Data protector 304 may deny the access to the data accordingly. Further, when virtual machine 108A disconnects from physical USB device 114, data protector 304 may be configured to clear the physical memories of server 102 storing the data retrieved from physical USB device 114 and any other related information, e.g., the frequency of accessing physical USB device 114.

Figure 4:
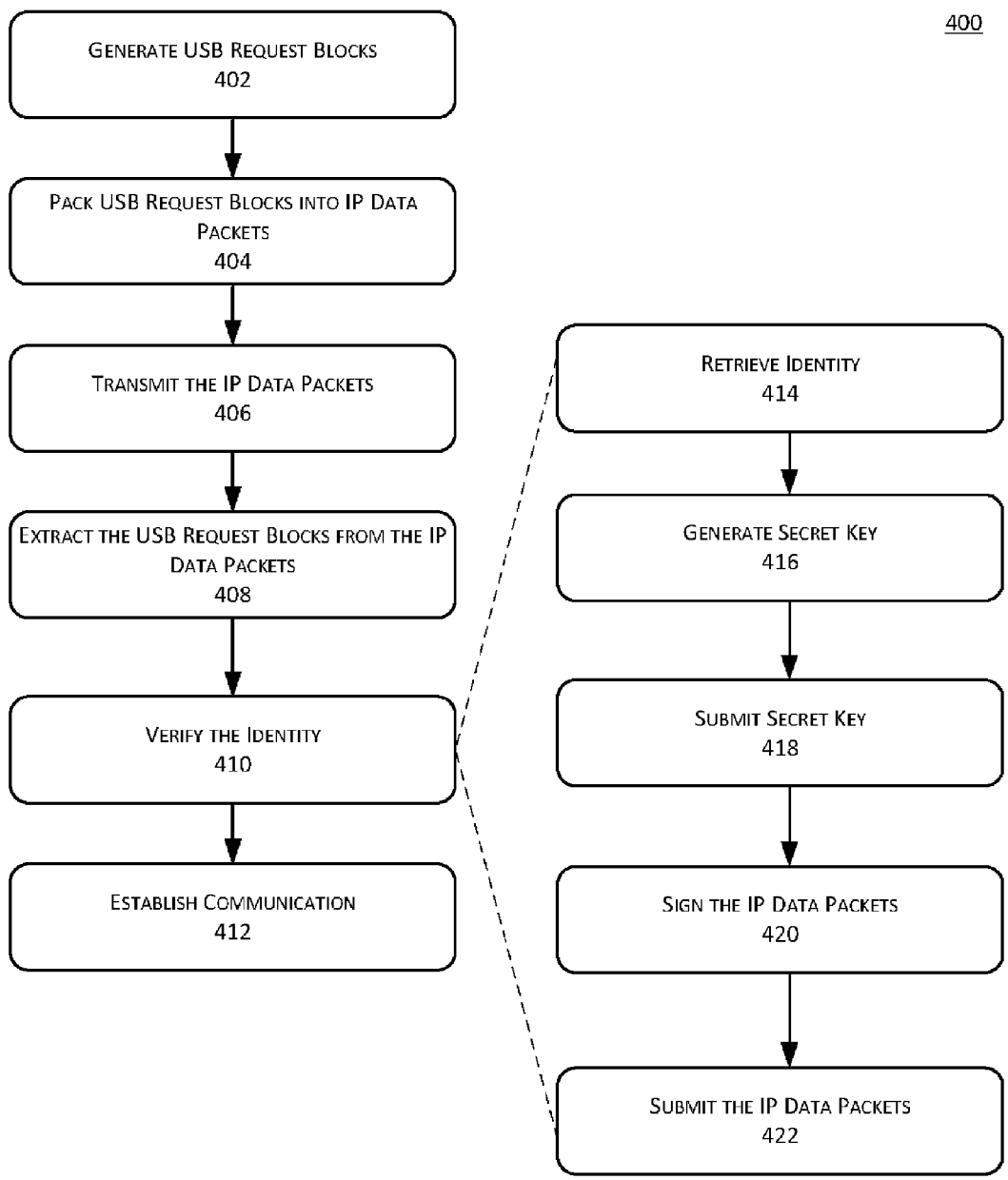
FIG. 4 shows an example configuration of a processing flow of operations by which USB device access may be implemented, arranged in accordance with at least some embodiments described herein.

FIG. 4 shows an example configuration of a processing flow of operations by which USB device access may be implemented, arranged in accordance with at least some embodiments described herein. As depicted, processing flow 400 may include sub-processes executed by various components that are part of example systems 100, 200, and 300. However, processing flow 400 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operation, functions, or actions as illustrated by one or more of blocks 402, 404, 406, 408, 410, 412, 414, 416, 418, 420, and 422. Processing may begin at block 402.

Block 402 (Generate USB Request Blocks) may refer to one of extended USB frontend drivers 202 (e.g., extended USB frontend driver 202A) generating one or more USB request blocks to request access to one or more of physical USB devices 114. USB frontend driver 202 may submit the generated one or more USB request blocks to hypervisor 106, which may then transmit the one or more USB request blocks to device management module 206, via extended USB backend driver 204. The one or more USB request blocks may include operation commands, e.g., printing a document on a USB printer, activating a USB web camera, etc. Processing may continue from block 402 to block 404.

Block 404 (Pack USB Request Blocks into IP Data Packets) may refer to virtual USB controller 208 packing, or encapsulating, the one or more USB request blocks into one or more IP data packets for further transmission over network 218, via virtual USB controller 208, to virtual USB interface 210. Processing may continue from block 404 to block 406.

Block 406 (Transmit the IP Data Packets) may refer to virtual USB interface 210 transmitting and receiving the one or more packed IP data packets to and from client computing device 104, via network 218, which may include intranet, extranet, or internet. Processing may continue from block 406 to block 408.

Block 408 (Extract the USB Request Blocks from the IP Data Packets) may refer to stub driver 212 decoding the one or more packed IP data packets, extracting the USB request blocks from the IP data packets, and submitting the one or more USB request blocks to physical USB interface 214. Processing may continue from block 408 to block 410.

Block 410 (Verify the Identity) may refer to stub driver 212 verifying the identity of virtual machine 108A prior to establishing communication between physical USB device 114 and virtual machine 108A.

Block 410 may include sub-processes as depicted in FIG. 4 as blocks 414, 416, 418, 420, and 422. Sub-processing associated with block 410 may begin at block 414.

Block 414 (Retrieve Identity) may refer to device management module 206 retrieving identity information from one of virtual machines 108 (e.g., virtual machine 108A). Sub-processing may continue from block 414 to block 416.

Block 416 (Generate Secret Key) may refer to device management module 206 generating verification information, e.g., a secret key. That is, upon receiving the one or more USB request blocks from extended USB backend driver 204, device management module 206 may record the identity of virtual machine 108A and, based on the identity, generate a secret key that may be forwarded to virtual machine 108A for verification of the identity of the one or more of virtual machines 108 prior to authorizing the communication between virtual machine 108A and physical USB device 114. The secret key may be obtained by stub driver 212 from, or transmitted by, virtual machine 108. Sub-processing may continue from block 416 to block 418.

Block 418 (Submit Secret Key) may refer to device management module 206 submitting the secret key to virtual machine 108A. Virtual machine 108A may then forward the secret key to client computing device 104 that is communicatively coupled to physical USB device 114. Sub-processing may continue from block 418 to block 420.

Block 420 (Sign the IP Data Packets) may refer to stub driver 212 signing the one or more packed IP data packets with the aforementioned secret key, i.e., associating the aforementioned secret key to the IP data packets. Sub-Processing may continue from block 420 to block 422.

Block 422 (Submit the IP Data Packets) may refer to stub driver 212 submitting the signed IP data packets to device management module 206. Since the secret key contains the identity of virtual machine 108A, device management module 206 may then authorize the communication between virtual machine 108A and physical USB device 114. Processing may continue from block 422 to block 412.

Block 412 (Establish Communication) may refer to device management module 206 establishing communication between virtual machine 108A and physical USB device 114. Virtual machine 108A may then retrieve information from physical USB device 114, or interact with physical USB device 114, according to the instructions included in the USB request blocks.

Figure 5:
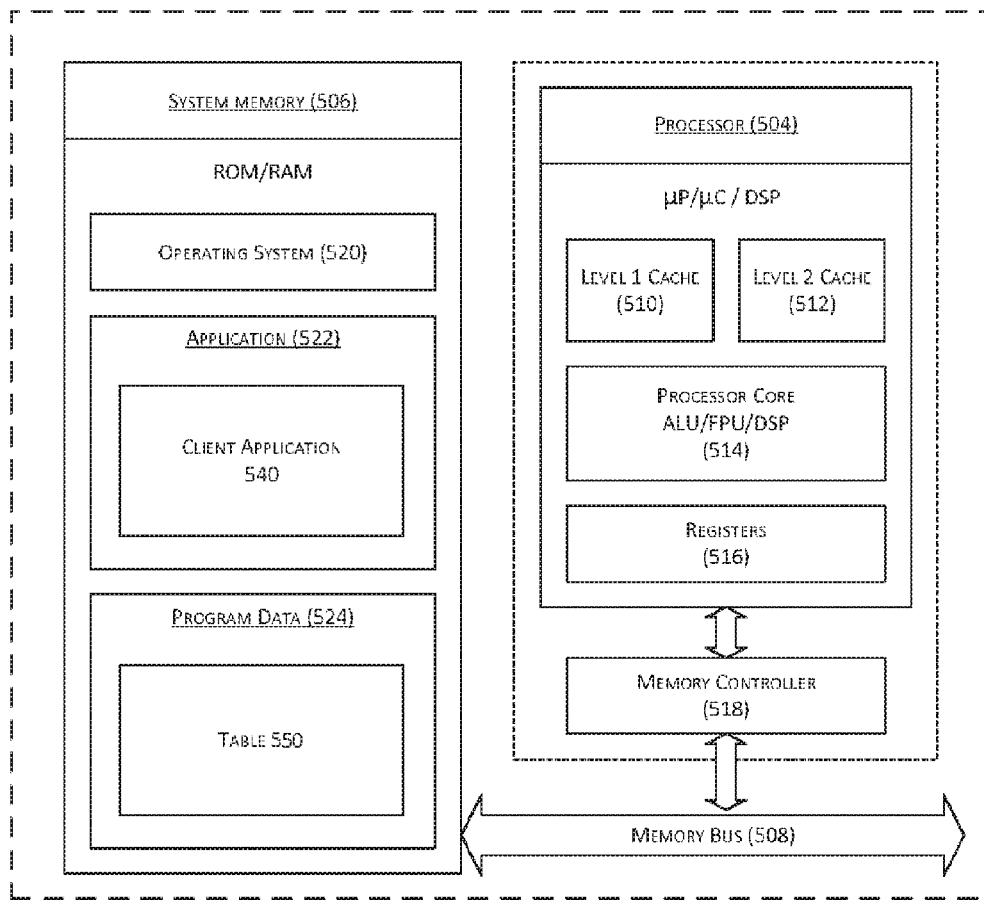
FIG. 5 shows a block diagram illustrating an example computing device that is arranged for content-based desktop sharing, arranged in accordance with at least some embodiments described herein.

FIG. 5 shows a block diagram illustrating an example computing device that is arranged for USB device access, arranged in accordance with at least some embodiments described herein.

More particularly, FIG. 5 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the example wireless communication system.

In at least example configuration, a computing device 500 may typically include one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. The processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524.

Application 522 may be configured to USB device access as described previously with respect to FIGS. 1-4. Program data 524 may include a table 550, which may be useful for USB device access as described herein.

System memory 506 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for wireless communication system 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs executing on one or more computers, e.g., as one or more programs executing on one or more computer systems, as one or more programs executing on one or more processors, e.g., as one or more programs executing on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A system, comprising:
    a server, comprising:
        one or more virtual machines configured to execute on the server; and
        a service console configured to receive one or more universal serial bus (USB) request blocks from one or more of the virtual machines; and
    a client computing device communicatively coupled to the server, the client computing device comprising:
        a physical USB interface, and
        a stub driver configured to:
            receive one or more IP data packets from the service console, and
            extract the one or more USB request blocks from the one or more IP data packets;
        wherein the service console is further configured to generate verification information regarding at least one of the one or more virtual machines and provide the verification information to the at least one of the one or more virtual machines and the client computing device.

2. The system of claim 1, wherein each of the one or more virtual machines comprises an extended USB frontend driver that is configured to generate the one or more USB request blocks.

3. The system of claim 1, wherein the server further comprises a hypervisor configured to control one or more hardware components of the server.

4. The system of claim 2, wherein the service console comprises:
    a device management module;
    an extended USB backend driver configured to transfer the one or more USB request blocks from the one or more extended USB frontend driver to the device management module; and
    a virtual USB controller configured to pack the one or more USB request blocks into the one or more IP data packets and to submit the one or more USB request blocks to the client computing device.

5. The system of claim 3, wherein the hypervisor comprises a data protector that has access to one or more physical memories of the server.

6. The system of claim 4, wherein the service console further comprises an input and output (I/O) monitor configured to monitor one or more input and output (I/O) activities of each of the one or more virtual machines.

7. The system of claim 1, wherein each of the one or more USB request blocks comprises instructions for read or write operations relative to one or more physical USB devices.

8. The system of claim 3, wherein the hypervisor is configured to utilize, interrupt, or forbid access to the one or more hardware components.

9. The system of claim 3, wherein the hardware components comprise system memories, central processing units, or network ports.

10. A method, comprising:
    monitoring one or more input and output activities of one or more virtual machines executing on a server;
    generating one or more USB request blocks that include one or more instructions to perform at least one of a read operation or a write operation with regard to one or more physical USB devices;
    packing the one or more USB request blocks into one or more IP data packets;
    transmitting the one or more IP data packets over a network for a client computing device;
    generating verification information regarding at least one of the one or more virtual machines; and
    providing the verification information to the at least one of the one or more virtual machines and the client computing device.

11. The method of claim 10, further comprising retrieving information from the one or more physical USB devices according to instructions included in the one or more USB request blocks.

12. The method of claim 10, further comprising prohibiting the one or more input and output activities of at least one of the one or more virtual machines.

13. The method of claim 10, further comprising:
providing the one or more USB request blocks to a device management module.

14. The method of claim 10, further comprising:
retrieving identification information of at least one of the one or more virtual machines;
generating the verification information according to the identification information; and
associating the verification information to the one or more IP data packets.

15. The method of claim 14, further comprising:
verifying the one or more IP data packets and the verification information; and
establishing a link between the at least one of the one or more virtual machines and the one or more physical USB devices.

16. A computer-readable medium storing instructions that, when executed, cause one or more processors to perform operations comprising:
receiving encrypted verification information based on identification of a virtual machine;
decoding one or more IP data packets associated with the virtual machine;
extracting one or more USB request blocks, from the one or more IP data packets; and
carrying instructions for at least one of a read operation or a write operation relative to one or more physical USB devices.

17. The computer-readable medium of claim 16, wherein the operations further comprise submitting the one or more USB request blocks to the one or more physical USB devices.

18. The computer-readable medium of claim 16, wherein the operations further comprise performing the one or more read or write operations relative to the one or more physical USB devices.

19. A computer-readable medium storing instructions that, when executed, cause one or more processors to perform operations comprising:
monitoring one or more input and output activities of one or more virtual machines executing on a server;
identifying at least one of the one or more virtual machines;
generating verification information according to the identification information;
providing the verification information to the at least one of the one or more virtual machines and a client computing device;
initiating one or more USB request blocks carrying instructions for read or write operations relative to one or more physical USB devices;
packaging the one or more USB request blocks into one or more IP data packets; and
transmitting the one or more IP data packets over a network for the client computing device.

20. The computer-readable medium of claim 19, wherein the operations further comprise prohibiting the one or more input and output activities of at least one of the one or more virtual machines.

21. The computer-readable medium of claim 19, wherein the initiating comprises submitting the one or more USB request blocks to a device management module.

* * * * *